United States Patent

Schayes et al.

[11] 4,188,643
[45] Feb. 12, 1980

[54] METHOD AND ARRANGEMENT FOR CORRECTING ERRORS IN FACSIMILE TRANSMISSION

[75] Inventors: Raymond G. Schayes, Brussels, Belgium; Pieter Homan, Hilversum, Netherlands; Ulf Rothgordt, Norderstedt, Fed. Rep. of Germany

[73] Assignee: U.S. Philips Corporation, New York, N.Y.

[21] Appl. No.: 836,503

[22] Filed: Sep. 26, 1977

[51] Int. Cl.² .............................................. H04N 1/38
[52] U.S. Cl. ................................................... 358/280
[58] Field of Search ............... 358/256, 167, 260, 261, 358/263, 280; 364/728; 360/38

[56] References Cited

U.S. PATENT DOCUMENTS

| | | | |
|---|---|---|---|
| 2,353,631 | 7/1944 | Bliss | 360/38 |
| 3,825,680 | 7/1974 | Uerhoeven | 358/167 |
| 3,895,186 | 7/1975 | Yoshida et al. | 358/280 |
| 3,974,326 | 8/1976 | Rosdolsky et al. | 358/280 |
| 4,063,284 | 12/1977 | Tatami | 360/38 |

FOREIGN PATENT DOCUMENTS

1512536  5/1969  Fed. Rep. of Germany ............. 360/38

Primary Examiner—Richard Murray
Assistant Examiner—Joseph A. Orsino, Jr.
Attorney, Agent, or Firm—Thomas A. Briody; William J. Streeter; Edward W. Goodman

[57] ABSTRACT

In facsimile transmission the sequences of picture elements having the same luminance are transmitted in coded form. The code words have, in general, different lengths and no ambiguous beginning or end marking respectively. Consequently, in case of a disturbance during the transmission not only the luminance values are generally falsified but also the plurality of successive picture elements so that in situ of the receipt picture lines appear which are too long or too short. In accordance with the invention it is now proposed in the case of a picture line which was received in a disturbed manner to compare it to one or both adjacent picture lines respectively, to take-over the portions having an adequate correlation, and, as regards the place of the disturbed portion to shift the end of the disturbed picture line in such a way that the definite line gets the prescribed length and to replace the portions of insufficient correlation by the corresponding information of one of the two adjacent picture lines. This comparison can be done relative to the two ends of the disturbed picture line. It is particularly favorable for the comparison that the picture elements of each picture line are grouped in equal groups and to check if the ratio of the number of, for example, black picture elements having a corresponding position in adjacent lines relative to the total number of black elements in the groups of the two lines together, remains below a given threshold value (decorrelation).

16 Claims, 13 Drawing Figures

METHOD AND ARRANGEMENT FOR CORRECTING ERRORS IN FACSIMILE TRANSMISSION

The invention relates to a method for correcting errors in facsimile transmission wherein graphic information on a document is transmitted by means of electric signals which represent the luminance values of the successive picture elements during line-by-line scanning of the document in the transmitter, the electric signals of each picture line being converted into code words such that the number and, possibly, the length of the code words over one picture line is variable and these code words together with end-of-line characters are transmitted to the receiver and are reconverted there in a sequence of electric signals corresponding to the sequence of the picture elements at the transmitter side and are stored, the number of picture elements of each picture line given by the signal sequence being compared with a predetermined value, wherein at a deviation of the number of picture elements of a line from the predetermined value an error correction is performed, as well as to arrangements for performing this method.

Said method is disclosed in German patent application No. 2,347,835 which has been laid open to public inspection. Herein, in the case of a disturbed, faultily received picture line wherein, on receipt of the end-of-line character, the predetermined number of picture elements was not received, the faulty signal sequence of the disturbedly received picture line is replaced by the signal sequence of the previous picture line. If, however, the disturbances in transmission of the code words increase, the transmitted picture, in the case of a printed document, especially in the case of small letters, becomes easily illegible or, in the case of graphic information, such as, for example, weathermaps, visible displacements occur.

It is an object of the invention to perform the above-mentioned method in such a way that, with a picture line which was received in a disturbed manner, the portions which are received undisturbed are preserved as much as possible and the correction is limited in principle only to the actually disturbed portions of the picture line. In accordance with the invention this is obtained by a method which is characterized in that during the error correction of the disturbed picture line the signals of this picture line are compared with the corresponding, stored signals of the preceding and subsequent picture line respectively, and that with a decorrelation ascertained relative to a threshold value on comparing the remaining portion of the disturbedly received picture line is shifted such that the definite picture line formed herewith comprises the predetermined number of picture elements.

By means of such a comparison it is possible to locate the area of the error location in the picture line sufficiently accurately, as it appeared that by correlation of the picture elements of two adjacent scanning lines a shift in picture elements produced by a transmission error becomes clearly noticeable in a surprising manner and the error location is consequently easy to find. Comparing the signals of the adjacent picture lines is done, especially in the usual case of the transmission of only two luminance values, namely black and white, only for the black picture elements which occur least frequently. In accordance with the invention a definite picture line which rather accurately corresponds to the scanned picture line and which contained faulty information in a small area only, limited by the picture line displacement, is obtained from the picture line which was received in a disturbed manner. With a suitable coding of the signal sequence as, for example, disclosed in German patent application No. 24 40 768 (PHD No. 74-158) which has been laid open to public inspection and corresponds to U.S. patent application No. 604,719, filed Aug. 14, 1975, now abandoned, the transmission of the faulty part of the picture line is only short in the case of a small disturbance, as this known code can be already decoded in the correct manner some bits after the disturbance relative to the beginning and the end of the code words. As such a disturbed area generally extends to over only a few millimeters the resulting detrimental effect on the legibility is small. Replacing the entire picture line in known manner is therefore not necessary and unwanted, whilst the present method furnishes an improvement in the picture quality.

In situ of the faulty picture elements wherein black elements in wrong places are particularly disturbing it is also possible that only white elements are produced which, as regards their optical impression, are considerably less disturbing. An efficient correction also implies that to correct the disturbed picture line the signals of the adjacent picture lines or one of the adjacent picture lines respectively are placed in those locations, where on comparison no sufficient correlation is present between the signals of adjacent picture lines and wherein signals of the disturbed, decorrelated picture line are not taken into account. In this manner the disturbed picture elements are corrected substantially optimally, so that it is hardly possible to recognize the fault.

A particularly good detection of the fault location in the picture line which was received in a disturbed manner, that is to say of the beginning and of the end of the disturbance, is possible if the comparison is performed relative to the initial and the final portion of the disturbed picture line and inserting the signals of the adjacent picture line or picture lines respectively is done in those places where an insufficient correlation is present either relative to the initial portion or relative to the final portion of the disturbed picture line. Owing to the end-of-line signal which is received at the same time the line end is defined as accurately as the beginning of the line so that imperfect agreement after a temporarily disturbance, owing to shifting of the subsequent picture elements after comparison relative to the end portion of the line is substantially eliminated.

Comparing the signals of adjacent lines and determining the deviation can be done in various manners, wherein a given deviation such as it also occurs with undisturbed adjacent picture lines should be permitted. However it is particularly favourable when, for comparing the signals of adjacent picture lines the signals of each picture line are grouped in equal groups, that in each group the ratio of the number of signals of a given value whose position corresponds to the adjacent picture line to the total number of signals of this value in both compared groups is determined and that if this ratio is smaller than a predetermined threshold value all signals of the relevant group of the disturbed picture line are corrected. This results in an improved or more accurate correlation respectively between adjacent picture lines so that the error location can be determined particularly accurately.

If with a disturbed picture line both the preceding and also the following picture line is stored it is efficient that a correction of a group of signals of a disturbed picture line is performed only then when on comparing the signals of this group with the corresponding signals of the two adjacent picture lines the decorrelation relative to the threshold value is ascertained in both cases. In this manner it is avoided that in a picture line which is received undisturbed a correction or an error indication is effected in a portion which just comprises the ends of lines which are substantially vertical to the direction of scan by a faulty correlation with the adjacent line without these ends. It is then not necessary to store the results of the comparisons separately.

It appears in practice that the case of a correlation which is not sufficient may occasionally occur in portions of a line which are not disturbed per se. It is therefore efficient that a correction of a group of signals of a disturbed picture line is performed only then if on comparison the decorrelation relative to the threshold value is found also in the adjacent group. The probability that in undisturbed portions of the picture lines an insufficient correlation with the adjacent lines occur in two or, possibly, various successive groups is small, depending on the size of the group. It is efficient that the number of picture elements of a picture line, the signals of which are comprised in one group, is between 10 and 100 and the threshold value for the ratio is between 0.35 and 0.4. Such a size of the groups results in an easy technical implementation and, at the same time, a proper efficiency in practice. The ratio of the number of corresponding signals relative to the total number equals 0.5 with a full correlation. As in practice a full correlation is only rarely to be expected also with undisturbed portions of the picture lines, the indicated value is chosen which on the one hand is sufficiently far below the values occurring with undisturbed picture lines, but on the other hand also allows a sufficiently safe determination of an actually present error.

In the first-mentioned patent application an arrangement is used for performing the known method which arrangement comprises a decoder for converting the received code words into corresponding sequences of electric signals, a counter for counting the total number of signals per picture line and a comparator for comparing the counter reading with a predetermined value on receipt of an end-of-line character. For performing a method according to the invention the arrangement is characterized in that a first store stores the decoded signal, that at least a second store is provided which stores the signals of an adjacent line, that a comparator is connected to the outputs of the two stores for comparing in parallel after receipt of the code words of a picture line, the signals read out successively from the stores and that on decorrelation relative to the predetermined threshold value the transfer of the signals from the first store to an output register is interrupted and the output register is switched over to the output of the second store, the output register being connected to a printing device. If the predetermined threshold value is not reached in the comparator (decorrelation) the error location is found with a high degree of probability and the signal of the preceding picture line are placed in this fault location instead of the signals of the disturbed picture line so that in this manner a simple correction of the disturbed picture line is obtained automatically. The second store may contain the signals of the picture line received prior to and/or after the disturbed picture line.

For a particularly effective and accurate error identification by comparing the two picture lines situated next to the disturbed picture line it is efficient that a third store is provided which contains the signals of the picture line which is located next to the picture line the signals of which are stored in the first store and whose signals are not present in the second store, that a second comparator is connected to the output of the first and the third store for the parallel comparison of the signals read out successively from the stores and that on decorrelation relative to the prdetermined theshold value for both comparators the switchover of the output register from the output of the first store to the output of the second store is done simultaneously. Consequently, a faulty reaction in the case of an insufficient correlation with only one of the two adjacent lines is avoided which may happen also in the case of non-disturbed picture lines, whereas an insufficient correlation in one place with the two adjacent picture lines most probably represents an error.

For a technical implementation it is efficient that the first, the second and the third store are provided with shift registers. This creates an easy store organization and addressing.

In order to be able to compare at a disturbedly received picture line wherein the length, after decoding, of the reconstructed picture line deviates from the predetermined length, the signals of the undisturbed portions of the disturbed picture line as simply as possible with the signal of adjacent picture lines and to correct the disturbed pixture line in an easy manner it is efficient for the shift registers to have a length equal to the number of signals per picture line and that the first store comprises two shift registers, the first shift register of which stores the received line until this register is full and the second shift register receives all signals of a picture line and stores only the signals which were received last, that one input of the comparator or comparators respectively is connected to the series output of the first shift register and on decorrelation relative to the threshold value is switched-over to the series output of the second shift register and the input of the output register is switched-over to the output of the second store and, in the case of a subsequent exceeding of the threshold value on correlation, to the series output of the second shift register. Then the first shift register contains with certainty the beginning of the disturbed picture line and that, as far as to the disturbed place, also in the correct location, wherein in the case of a picture line which is reconstructed by means of decoding and which is too long the signals associate with the line end are not stored, and the second shift register contains with certainty the final portion of the disturbed picture line whilst in the case of a reconstructed picture line which is too long the signals of the beginning of the line are missing in this second shift register. However, the two shift registers together always contain the picture line portions which were received undisturbed and that as far as the disturbed place or from this place respectively. The comparator or comparitors respectively ascertain this disturbed place and for the definited reconstruction the input of the shift register is switched-over from the first to the second shift register, the information of an adjacent picture line being placed in the place of disturbance itself. A combination of the signals of the two adjacent picture lines can also be placed in this place of disturbance, for example via an AND-gate for picture elements of the most striking value, that is to say through an AND-gate for the black elements in black-white transmission.

To compare the signals of adjacent picture lines group-by-group it is efficient for each of the respective comparators to comprise a first and a second counter, the first counter counting the number of signals of the determined value which have the same position in both the stores which are connected to the comparator and the second counter counting the total number of signals of the determined value in two two stores, that a first and a second intermediate store respectively are connected to the counters which intermediate stores take-over the counter reading after a predetermined number of signals read from the connected stores, whereafter the counters are reset to a starting position, that, connected to the second intermediate store there is a multiplier which multiplies the contents of the second intermediate store by the threshold value of the ratio and enters it into a third intermediate store and that a comparator locally compares the contents of the first and of the third intermediate store and supplies a signal if the value present in the third intermediate store exceeds the value present in the first intermediate store. Each time resetting the counters to a starting position after a predetermined number of read signals results in the group-by-group combination. The multiplier in combination with the comparator, instead of forming a quotient, furnishes a technically simpler implementation. In addition it may happen that the groups of adjacent lines to be compared are completely without picture elements of the determined value, that is to say they contain no black picture elements so that, as a result, the quotient would be undefined. Multiplying and comparing, however, always result in an unambiguous value. Herewith a positive result of the comparison is equal to a sufficient correlation between adjacent lines. In these places the presence of an error can be excluded to a high degree of probability.

Embodiments of the invention will be explained below in greater detail with reference to the drawing. In this drawing.

The method will be illustrated with reference to the FIGS. 1 and 2.

It is assumed that a picture line comprises 1728 elements which are each represented by a bit.

Figure 1A:
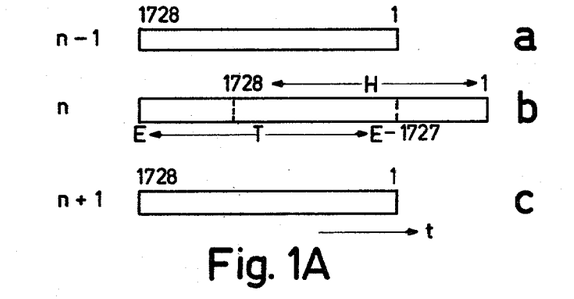
FIGS. 1A, 1B and 1C show diagrams for illustrating the operation of the method according to the invention for the case the length of the coded line is too long.

In the lines a, b and c of FIG. 1A the picture line n+1, n and n−1 are shown on the basis of the number of bits. The length of the line n exceeds the normal number of 1728 bits.

Figure 1B:
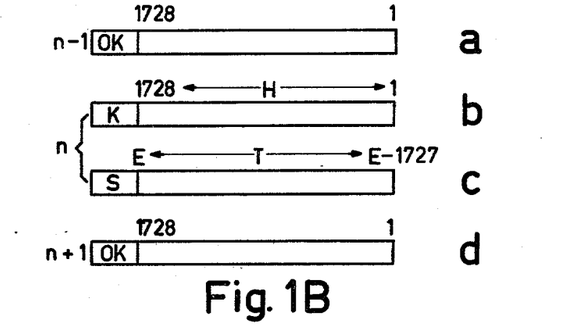

Lines a, b, c and d of FIG. 1B show the manner in which the picture information of the lines n−1, n and n+1 are stored in locations of an information store.

The information of picture line n is distributed over two locations in, for example, the form of shift registers. The head of line n (H) which consists of the bits 1 to 1728 inclusive is stored in the location in accordance with line b. The tail of line n (T) which consists (from the rear to the beginning) of the last bit E of line n to bit E-1727 inclusive is stored in the location in accordance with line c.

Each storage location has room for storing a tag which indicates whether a line of proper length is stored in the location (OK) or whether the head (K) or the tail (S) respectively of a line is stored therein.

From the bases of these tags a processor can pass the information of a line on to the register of a printing device or correct the line information first and then pass it on to the register.

Figure 1C:
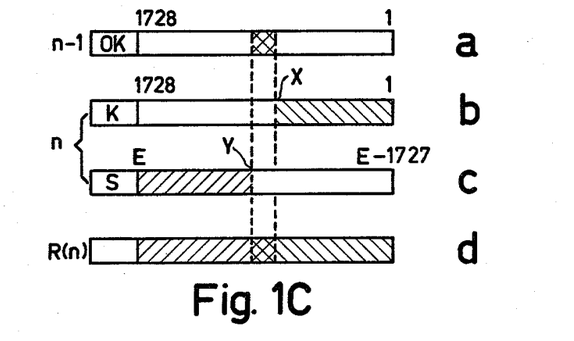

Correcting the line information of line n is done in the manner shown in FIG. 1C.

From bit number 1 onwards the head or beginning of line n is compared bit by bit with the corresponding bits of line n−1 and/or line n+1. The number of times inequality is checked in a register. If this number exceeds a determined limit, which implies decorrelation, the comparison procedure is stopped. A location X is determined in this manner, see line b of FIG. 1C.

In a similar manner the tail of line n from bit number E onwards, that is to say from the rear, is compared bit by bit with line n−1 and/or line n+1. A location Y is determined here, in the same manner, see line c of FIG. 1C.

The locations X and Y constitute the limits of the interval wherein an error is probably made during decoding. As a criterion for the determination of the locations X and Y use is made of the correlation existing between the picture lines. So no additional information in the form of check bits is required for determining the location of the error.

The definite reconstruction R (n) of line n as shown in line d of FIG. 1C is now formed from the beginning onwards from the bits having the numbers 1 to X inclusive of the head of the decoded line and from the rear onwards by the bits E to Y inclusive of the tail of the decoded line.

It may happen that X=Y. In that case R (n) can be composed entirely from the head and the tail of the line n. If X is smaller than Y the line position between X and Y is left which cannot be determined from the head or the tail of the line. For this line portion the corresponding portion of line n−1 may be filled in in the reconstruction R (n).

Figure 2A:
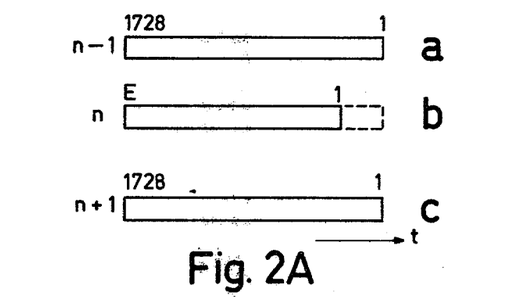
FIGS. 2A, 2B and 2C show diagrams for illustrating the operation of the method according to the invention for the case the length of the decoded line is too short.
Figure 2B:
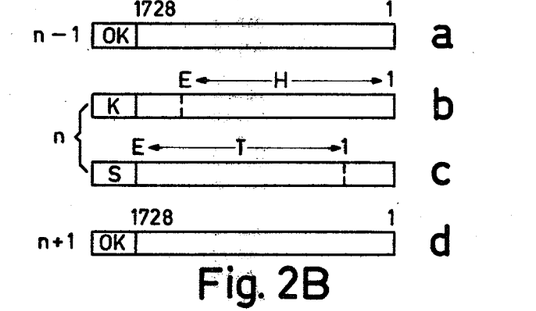
Figure 2C:
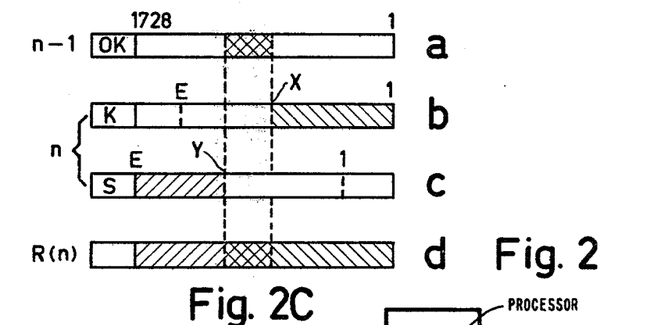

FIG. 2 illustrates the case that the decoded line is smaller than 1728 bits. The lay-out of FIG. 2 is fully identical to that of FIG. 1 and is self-explanatory. The only difference is that the storage locations for the head and the tail of line n are not completely full and that both contain the same information, however shifted over a number of places.

In this case of a line which is too short X is always smaller than Y. The line portion missing between X and Y can be derived from n−1.

Figure 3:
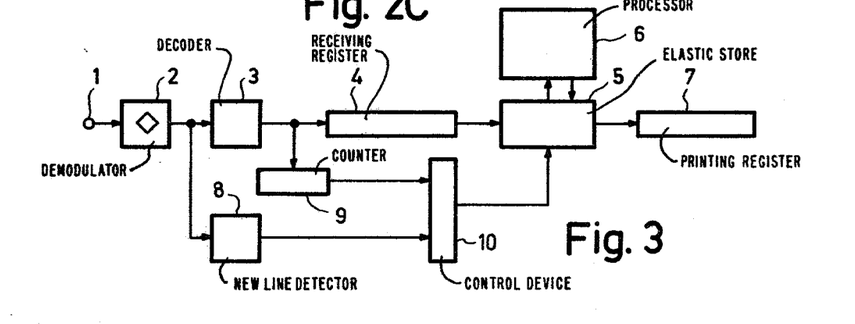
FIG. 3 is a block diagram of a receiver for use in the method according to the invention.

A receiver shown in FIG. 3 for use of the method comprises an input terminal 1 for receiving the line signals, a demodulator 2, a decoder 3, a receiving register 4, an elastic store 5, a processor 6 and, by way of output, the register 7 of the printing device.

In addition the receiver will comprise a detector 8 for detecting the beginning of a new line and a counter 9 for counting the number of bits of a decoded line. A control device 10 which is coupled to the counter 9 and detector 8 controls writing of the information into the elastic store 5. The device 10 in particular attends to identifying the information by OK, K or S and to writing the information in the proper location.

The processor 6 becomes operative when the identification K or S is detected. In this case the transmission of the information to register 7 is interrupted. The processor reconstructs the line from the information identified by K and S and passes the reconstructed line on to the register 7.

Figure 4:
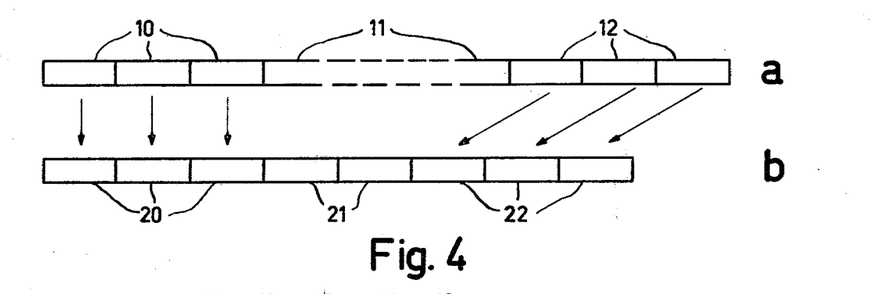
FIG. 4 shows the definite reconstruction of a disturbed (extended) picture line such as the latter will be described for the receiver shown in FIG. 6.

In FIG. 4 line a represents diagrammatically the succession of the signals which are associated with a picture line which is received in a disturbed manner and which comprises on the basis of the disturbance, for example, an excessive number of picture elements. This picture line which is received in a disturbed manner is subdivided into groups 10 and 12 which are separated by groups 11 having disturbed information. The groups 10 from the beginning of the picture line are utilized as groups 20 for the initial portion of the ultimately reconstructed picture line which is shown in FIG. 4, line b. In the same manner the groups 12 at the end of the disturbed picture line are utilized as groups 22 for the final portion of the reconstructed picture line, however shifted so that the end of the reconstructed line is shifted to the correct location. The groups 21 are associated with the disturbed groups 11 of the picture line which was received in a disturbed manner, whose location is determined by comparison to the adjacent picture lines. Consequently these disturbed groups 11 are not taken over but the groups 21 remain completely empty or are filled with the information of an adjacent picture line.

Figure 5:
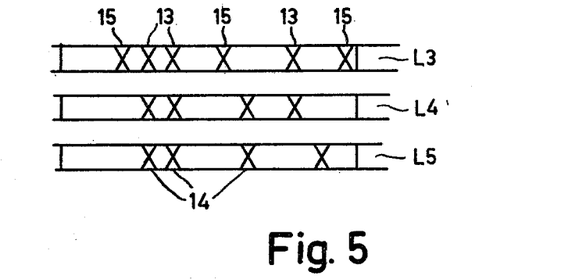
FIG. 5 shows a group of signals in three successive picture lines.

FIG. 5 shows three groups of signals which are located each time in the same place in successive picture lines L3, L4, and L5. Crosses indicate the signals associated with the picture elements which occur in a smaller number, that is to say belonging, in a customary manner, to the black picture elements. Comparing the line L3 and L4 results in three pairs of corresponding signals in the places 13, whilst the signals in the places 15 in the line L3 have no corresponding signals in the line L4. In total the group shown has ten signals of the relevant value (black) in the lines L3 and L4. The ratio or corresponding signals to the total number of signals consequently results in a correlation number $K1=0.3$. Comparing the lines L4 and L5 also furnishes three pairs of corresponding signals in the places 14, however, with a total number of eight signals in this group in the two lines L4 and L5. This results in a correlation number $K2=0.375$. If the value 0.375 is taken as predetermined threshold which is not difficult to realize technically, as will be explained below, then the total correlation will be positive in the case to be described as, for a proper correlation, only one of the two correlation numbers K1 and K2 need be equal to or greater than the threshold. From the foregoing it appears that a complete agreement furnishes a correlation number $K3=0.5$.

Figure 6:
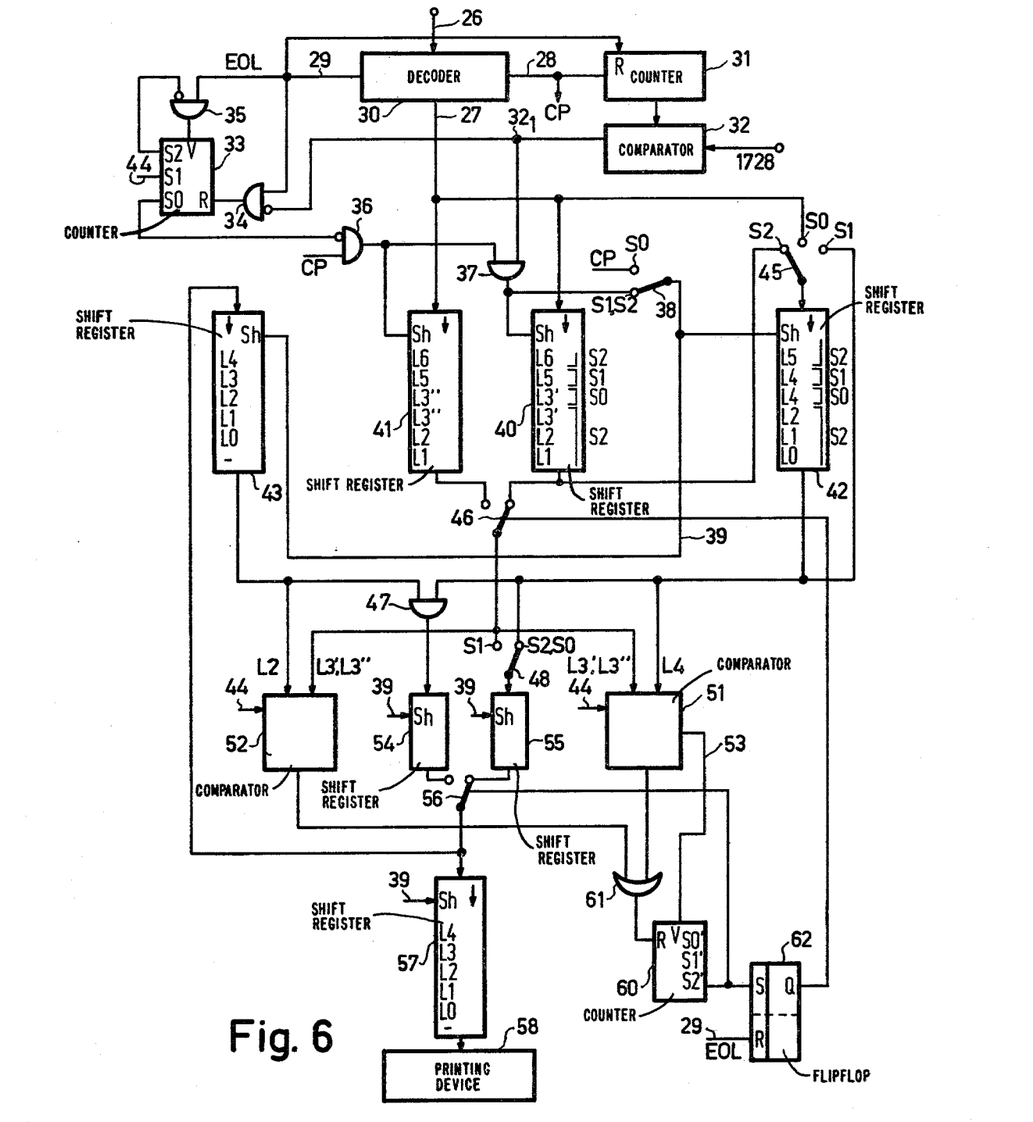
FIG. 6 shows a block diagram of a complete receiving arrangement.

In the block diagram shown in FIG. 6 a decoder 30 is supplied through the input 26 with code words transmitted from a transmitter and converts it into a sequence of corresponding signals at an output 27. Simultaneously a clock pulse signal CP is produced at an output 28 which signal appears simultaneously with or shortly after respectively a signal at the output 27. On receipt of a character which indicates the end of the line, an end-of-line signal EOL is produced at an output 29.

The output 27 of the decoder 29 is connected to the information inputs of shift registers 40 and 41 which function as a first store, as well as to a contact of a switch 45 which leads to the information input of a shift register 42 which functions as a second store. Reference 43 indicates a shift register which functions as a third store. The takeover of the information in a shift register is only done if in the presence of this information a shift clock pulse signal is available at the shift clock input Sh. These shift clock pulse signals are supplied by components which will be further explained below.

The clock pulse signal CP at the output 28 of the decoder 30 is applied inter alia to the counting input of a counter 31 which is reset by the end-of-line signal EOL at the lead 29 to its starting position or O-position respectively. At each clock pulse signal CP, that is to say at each signal at the output 28 of the decoder 30, this counter 31 moves one counting position further. At the end of a picture line L which is received in an undisturbed manner, that is to say when the next end-odd-line signal EOL arrives, the counter 31 has counted the predetermined number of picture elements which number may in this example be 1728. If this value is not attained or has been exceeded at the end of the picture line L a disturbance was produced during the transmission of this picture line L.

To ascertain this the position of the counter 31 is compared to the fixed value 1728 in a comparator 32. If on the arrival of the end-of-line signal EOL the comparator 32 does not deliver a signal at its output $32_1$ that is to say a logic "0" for the non-coincidence of the end-of-line signal EOL and the counting value 1728, the AND-gate 34 is released by supplying the logic "0" to an inverting input, which is indicated by means of a circle, so that the signal EOL arrives at the reset input R of a control counter 33 which is reset to the 0-position (S2, S1, S0=001). Owing to the logic "1" at the control counter output S0 and the supply to an inverting input of an AND-gate 36 the latter is cut-off and at the point of the AND-gate 36 the clock-pulse signals CP present at an input no longer appear. However, in the quiescent state (S2, S1, S0=100) the control counter 33 is in a position 1 (S2=1) in which the supply of counting pulses to a counting input V is blocked by an AND-gate 35 as the output S2 with the logic "1" is connected to an inverting input thereof.

Figure 7:
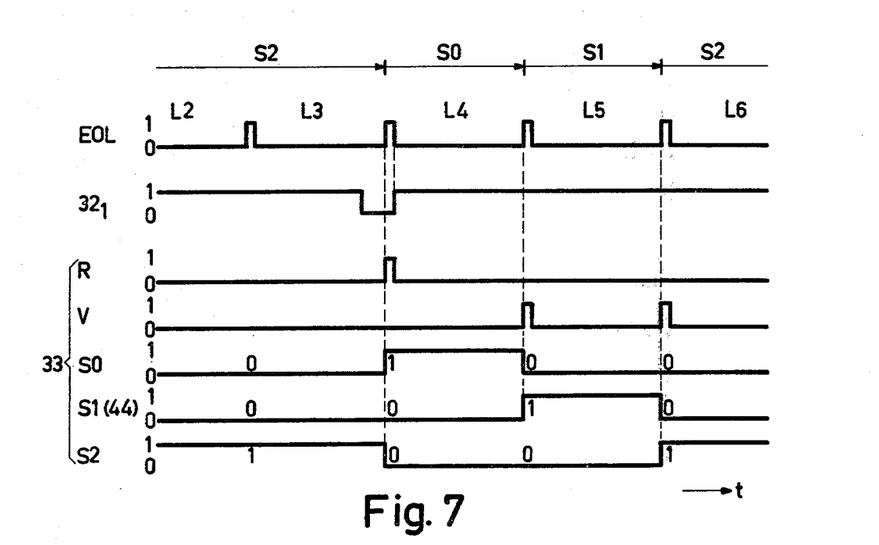
FIG. 7 shows a time diagram for representing signals on receipt of a disturbed picture line by the arrangement shown in FIG. 6.

In FIG. 7 the signals described above are plotted the positions 0, 1 and 2 of the control counter 33 with So, S1 and S2 (alternatingly equal to the logic "1") being indicated along the time axis t. It is assumed that all switches are in the position shown in the drawing and shift clock pulses are applied to the shift clock pulse input Sh of the shift registers 40 and 41 and consequently, also to shift registers 42 and 43 as the control counter 33, as mentioned before, is in the position 2 (S2=1). The information input of the shift registers 40 and 41 is connected to output 27 of the decoder 30, the information input of the shift register 42 is connected through the switch 45 to the series output of the shift register 40 and the information input of both the shift register 43 and an output register 57 are connected, leaving the intermediate circuit of an intermediate register 55 out of account, to the series output of the shift register 42. The output register 57 controls a printing device 58 for printing the received picture lines L. In a corresponding implementation of the arrangement the output register 57 may be replaced by the shift register 43.

At the end of the picture line L1, of which it is assumed that it has been received undisturbed, the shift registers 40 and 41 contain the signals of this picture line, the shift register 42 contains the signals of the preceding picture line which is here indicated by L0 and the shift register 43 contains the signals of the picture line received prior to that. In FIG. 6 all this is indicated at the shift registers whilst bearing in mind that taking up the information of a picture line involves the delivery of the information of the preceding picture line. At the end of the reception of the picture line L2 which is also received in the correct manner the shift registers 40 and 41 contain the signals of this picture line, in which situation the shift register 41 is not required for the time being but becomes so on receipt of a picture line L which is transmitted in a disturbed manner, as will be further described. During the reception of the picture line L2 the signals of the picture line L1 successively appear at the series output of the shift register 40 and are entered through the switch 45 and the information input of the shift register 42 into this shift register. Simultaneously there appear at the series output of this shift register the signals of the picture line L0 present therein which are entered through a switch 48, an intermediate register 55 and a switch 56 into the shift register 43 and the output register 57. So now the contents of the shift registers at the end of the reception of the picture line L2 is given.

The picture line L3 is assumed as having been received in a disturbed manner. Originally the procedure is the same as on the reception of a picture line L which is received undisturbed. Now it is assumed that owing to the disturbance a greater number of signals appears at the output 27 of the decoder 30 which agrees with a picture line, that is to say more than 1728. Consequently the counter 31 is implemented with a correspondingly wide counting range, that is to say with a corresponding number of stages. As soon as this counter 31 then exceeds the position 1728 a logic "0" appears at the output $32_1$ of the comparator 32 as a consequence of which an AND-gate 37 is cut off and no shift clock pulses CP arrive anymore at the shift registers 40, 42 and 43 as well as at the output register 57 (lead 39). At that moment the shift register 40 is completely full from the beginning of the disturbed picture line L3, that is to say the first signal of this picture line has arrived in the storage stage nearest the output, and likewise the signals of the picture line L2 which were previously present in the shift register 40 are completely transferred into the shift register 42 and the signals of the picture line L1 which were present therein into the shift register 43 in the output register 57 as shown in FIG. 6. Only the shift register 41 is applied with additional shift clock pulses CP so that this register accommodates the remaining signals of the disturbed picture line L3, that is to say the last signal of this picture line is in the shift register 41 in the storage stage nearest to the information input. The distinction between the filling the shift registers 40 and 41 with the picture line L3 is indicated in FIG. 6 by L3' (initial portion) and L3" (final portion).

If now the end-off-line signal EOL arrives through the lead 29 at the input of the AND-gate 34, the latter is released as a logic "0" is present at the output $32_1$ of the comparator 32 and the control counter 33 is reset to the 0-position (S0=1), as shown in FIG. 7. Simultaneously the AND-gate 36 is cut off so that the clock pulse signal CP is prevented from reaching the shift clock pulse inputs Sh of the shift registers 40 and 41. In addition, at the 0-position (S0=1) of the control counter 33 the switch 38 is switched-over to another position as indicated by the indication S0 at this contact. Likewise the indications S0, S1 and S2 at the switches 45, 48 relate to the positions of the control counter 33. Consequently, the switch 45 is switchedover to the central position so that the information input of the shift register 42 is connected to the output 27 of the decoder 30. The switch 48 remains as yet in the position shown. At the beginning of the reception of the picture line L4 the signals produced by the decoder 30 at the output 27 are consequently taken over in the shift register 42 whilst the signals of the picture line L2 present herein are transferred to the shift register 43 and the output register 57. Owing to the missing shift clock pulses the contents of the shift registers 40 and 41 remain unchanged. At the end of the picture line L4 the end-off-line signal EOL at the lead 29 switches the control counter 33 on in the position 1 (S1=1) through the AND-gate 35 which is now released (S2=0). At that moment the shift registers 40 and 41 contain the signals of the picture line L3' and L3" respectively which were received in a disturbed manner, the shift register 42 contains the signals of the following picture line L4 and the shift register 43 the signals of the preceding picture line L2. Whereas now the picture line L5 is received the determination of the error and correcting the picture line L3 which was received in a disturbed manner are simultaneously effected in the following manner.

All shift registers 40 to 43 now again receive parallel shift clock pulses as the control counter 33 is in the 1-position (S1=1, S0=0) as a consequence of which the AND-gate 36 is again released for the clock pulse signal CP, the switch 38 being again in the position shown. The switch 45 is in the right-hand position so that the output of the shift register 42 is connected to its input. The switch 48 is in the position opposite to the position shown so that the input of the intermediate register 55 is connected to the output of the switch 46, that is to say first of all to the series output of the shift register 40. However, it should be noted that the intermediate register 55 forms part of the shift register 43, that is to say together they just contain the signals of the picture line L. The required length of the intermediate register 55 which length corresponds to that of a further intermediate register 54 will be explained below. The 1-position of the control counter 33 furthermore releases the comparators 51 and 52 through lead 44 (S1=1).

The shift clock pulses which are simultaneously present at all shift registers 40 to 43 apply the signal of the same position from the picture lines L2, L3 and L4 in parallel to the comparators 51 (L3', L4) and 52 (L2, L3'). In these comparators the correlation number is determined each time for a group of successive signals, for example 32 signals. At the end of the comparison of each group a signal appears at a lead 53 of the comparator 51 which signal is applied to the V-input of a counter 60 and causes this counter to move one position further. If, however, in at least one of the comparators 51 and 52 the fixed correlation number was exceeded a logic "1" which is applied to the R-input and which keeps the counter 60 in the reset position is available at the output which is connected to an OR-gate 61. Only if the fixed correlation number is not exceeded in the two comparators the counter 60 can move one position further, that is to say it holds for S2', S1', S0' that the counter switches from 0, 0, 1 to 0, 1, 0.

If, however, an adequate correlation is present in the following group between at least two adjacent picture lines L and, consequently, the fixed correlation number is exceeded in the counter 60 is reset again. Only in the case no adequate correlation with the two adjacent picture lines L is present in two successive groups the counter 60 can move to the position 2 (S2', S1', S0'=100). This is the signal indicating that the disturbed place of the received picture line L has been found. If in this case the intermediate register 55 has a length corresponding to 2 signal groups, it just contains the two signal groups which were found to be disturbed whereas the shift register 43 has only taken up the signal groups which so far have been found to be undisturbed. The 2-position (S2'=1) of the counter 60 switches the switch 56, so that now the shift register 43 and the output register 57 are fed from the further intermediate register 54. The information input of this further intermediate register is connected to the output of an AND-gate 47 whose inputs are connected to the series output of the shift registers 42 and 43. Instead hereof the information input of the intermediate register 54 may also have been connected directly to the series output of only one of the two shift registers 42 or 43. The intermediate registers 54 and 55 are also implemented in an efficient manner as shift registers and are supplied with the shift clock pulse which is available on the lead 39.

In addition a bi-stable trigger circuit 62 is connected to the output for the 2-position (S2'=1) of the counter 60 which in this position of the counter 60 is switched-over and which, in its turn, owing to the output signal (Q) thereof switches the switch 46 so that now the signals at the series output of the shift register 41 are processed. It is, however, in the first place probable that also the shift register 41 contains disturbed signal groups in this place.

Not before at least one of the comparators 51 or 52 ascertains an adequate correlation between the remaining part of the picture line L3'' in the shift register 41 and the corresponding parts of the picture line L4 or L2 in the shift registers 42 or 43 the counter 60 is reset to the 0-position (S0'=1) and the switch 56 returns to the situation shown so that now the shift register 43 and output register 57 are filled, as long as there is correlation, by the remainder, which is automatically in the correct position, of the picture line L3' in the shift register 41.

In the example given resetting takes already place after the determination of correlation in only one group of picture elements. The result is that resetting a group of picture elements occurs too early. In practice the display of the single disturbed group, depending on the choice of the size of the picture element groups is not disturbing. If it is experienced as being disturbing it is possible to delay the resetting action for the duration of a further picture element group.

So at the end of the reception of the line L5 the shift register 43 contains the correct picture line L3 which was received disturbed, the shift register 42 contains a picture line L4, as this register was closed between input and output and the shift registers 40 and 41 are automatically filled by the signals of the properly received, non-disturbed picture line 5.

If the picture line L5 was properly received the terminating end-off-line signal EOL on the lead 29 switches the control counter 33 to the 2-position (S2=1) so that this counter is again in the starting position. The switches 38, 45 and 48 are again in the position shown. The switch 56 had already assumed its shown position as the counter 60 was reset as the result of an adequate correlation and the bistable triggering circuit 62 is reset by the signal EOL so that also the switch 46 is in the position shown. On receipt of the picture line L6 the shift registers 40 and 41 then again take over the decoded signal, the shift register 42 takes over the signals of the picture line L5 from the shift register 40 and the shift register 43 takes over the signals of the picture line L4 from the shift register 42 through the switch 48.

However, in case the picture line L5 was again received in a disturbed manner the same situation as at the end of the picture line L3 which was received disurbed is created and also the further procedure is done in the same manner.

In contradistinction to the signal comparison described for FIG. 1C, line c, from the end of the picture line n and n-1 to the location Y, the signal comparison in the device shown in FIG. 6 occurs from the location X to the end E of the picture line n. This is not important for the working principle as, assuming there are no further disturbances, the decorrelation measurement from E to Y furnishes a similar result as the correlation measurement from X to Y, the switch 46 in FIG. 6 being switched-over in situ of X.

Furthermore it should be noted that the block diagram of FIG. 6 is, for simplicity, described on the assumption that counter 41 and the comparator 32 operate for a count exceeding 1728. Using a counter and a comparator provided with three outputs corresponding to not attaining, exactly attaining and exceeeding the fixed count, results in a simple possibility to apply in the case of non-attainment additional shift clock pulses to the shift register 40 only so that the initial information of the partial information filling thereof is shifted on to the output whereas the shift register 41 remains partially filled from the input.

Figure 8:
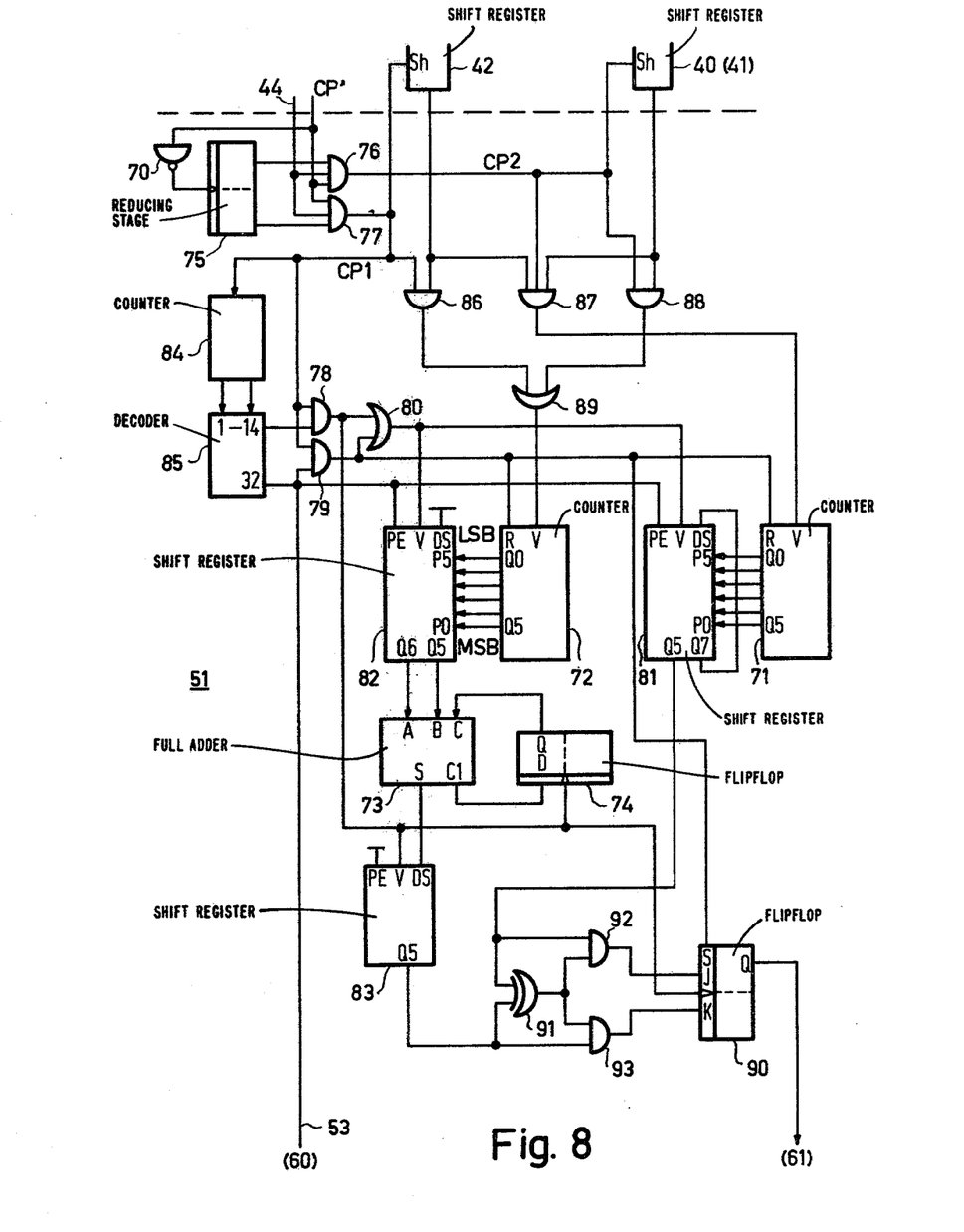
FIG. 8 shows the construction of a comparator present in the arrangement shown in FIG. 6.

FIG. 8 shown an example of the internal set-up of the comparators 51 and 52 respectively for comparing the signals of adjacent picture lines group-by-group, this set-up being further explained with reference to the time diagram in FIG. 9.

The input of the comparator 51, taken as example here, are connected to the series outputs of the shift registers 40 or 41, depending on the position of the switch 46 in FIG. 3 and to the series output of the shift register 42 which are both shown diagrammatically in FIG. 8. In addition the comparator 51 receives a clock pulse signal CP', which is also assumed to be produced by the decoder 30 in FIG. 6 and which has double the frequency of the sequence of the signals at the output 27. This clock pulse signal CP' is applied to the clock pulse input of a reducing stage 75 and that through an inverter 70 if this reduction stage 75 switches on the raising edge of the clock pulse. The reducing stage 75 produces a signal such as this is indicated by 75 in FIG. 9 and the inverse signal is produced at the other output. The two outputs of the reducing stage 75 are connected to inputs of two AND-gates 76 and 77, whose other inputs the clock pulse signal CP' and, through the lead 44, the release signal originating from the S1-output of the control counter 33 are supplied. At the outputs of these two AND-gates 76 and 77 there are produced clock pulse signals CP2 and CP1 which are shifted relative to one another and which are shown in FIG. 9 and which occur with the frequency of the signals at the output of the decoder 30 of FIG. 6.

The clock pulses CP1 and CP2 which are shifted to one another are applied to the shift clock pulse input Sh of the shift register 42 and 40, 41 respectively to read the information shifted relative to one another, so that the total number of signals of the given value (black) which correspond to the logic "1" can be counted more easily as will be explained here below. Applying the clock pulse signal CP1 to the shift clock pulse input Sh of the shift register 42 or for the further comparator 52 to the shift register 43 respectively can be done through an additional switching contact at the switch 38 in FIG. 6, whereas the shift clock pulse signal CP2 can be applied through a switch (not shown) in the 1-position of the control counter 33 in FIG. 6 to the shift registers 40 and 41. Producing the clock pulse signals CP1 and CP2, which are shifted relative to one another may also be effected in common for the two comparators 51 and 52 in FIG. 6.

Figure 9:
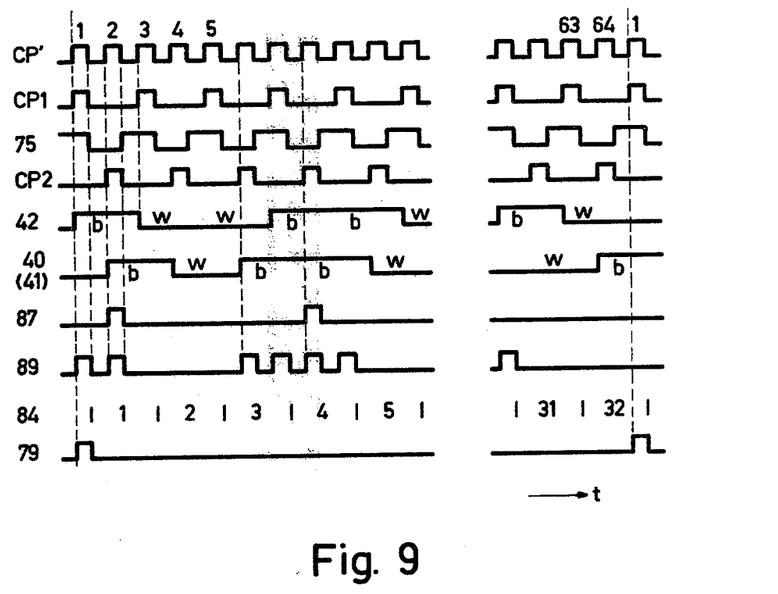
FIG. 9 shows a time diagram for explaining the functioning of the comparator.

It is assumed that the signals shown in the corresponding lines of FIG. 9 are read from the shift registers 42 and 40 or 41 respectively. The black or white information respectively of the picture elements is indicated by b or w respectively. With the first pulse of the clock pulse signal CP' with which also a pulse of the clock pulse signal CP1 is formed a signal is produced at the output of an AND-gate 86 which signal is applied through an OR-gate 89 to the counting input V of a counter 72 which switches one position further on the trailing edge of this pulse. With the second pulse of the clock pulse signal CP', a pulse of the clock pulse signal CP2 being produced, a signal is produced at the output of an AND-gate 88 which supplies through the OR-gate 89 a further counting pulse to the counting input of the counter 72. All three inputs of an AND-gate 87 are now simultaneously energized so that this gate supplies an output pulse to the counting input V of a counter 71. On the third pulse of the clock pulse signal CP' the output of the shift register 42 has a logic "0" (information W=white) so that no pulse is produced at the output of the AND-gate 86. In a corresponding manner the further pulses shown in FIG. 9 are produced at the output of the AND-gate 87 and of the OR-gate 89. The correlation of the signals in the shift registers 42 and 40 or 41 respectively is recognized more clearly if the information (40, 41) read herefrom is shifted in FIG. 9 one clock period to the left (relative to 40) to compensate for the effects of the shift relative to one another of the two clock pulses CP1 and CP2.

The clock signal CP1 is furthermore applied to a counter 84 having a counting capacity of 32 which switches one position further at each traling edge of this clock pulse signal. The positions of the counter 84 are shown in FIG. 9 by means of the correspondingly indicated line. A decoder 85 which inter alia counts the highest counting position 32 and and supplies a signal to the corresponding output (32), is connected to the output of this counter. In this position the preparation inputs PE for the parallel take over of information from the counters 71 and 72 are controlled in two shift registers 81 and 82. With the next clock signal CP1 at the end of the counting position 32 a pulse (FIG. 9) is produced at the output of an AND-gate 79 which pulse is applied through an OR-gate 80 to the shift clock pulse input V of the shift registers 81 and 82 which take over the information available at the inputs P0 to P5 from the counters 71 and 72. The output signal of the AND-gate 79 simultaneously resets the counters 71 and 72 through the resetting input R to the starting position and adjusts a bistable triggering circuit 90 to a position in which the output Q has a logic "1".

With the following counter positions 1 to 14 of the counter 84 the decoder 85 produces a logic "1" at the corresponding output so that the pulses of the clock pulse signal CP1 can appear at the output of an AND-pulse gate 78. These pulses are applied to the clock pulse input V of a shift register 83, to a bistable triggering circuit 74 and to the bistable triggering circuit 90, and, through the OR-gate 80, also to the clock pulse inputs V of the shift registers 81 and 82.

Now the contents of the shift register 82 is multiplied by the number 0.375 and the result is transferred to the shift register 83. The contents of the shift register 81 performs one full cycle, as the output Q7 of this shift register is connected to the series input DS. As in the 32 steps of the clock pulse signals CP1 and CP2 till the occurrence of the following erase signal (79) not more than 32 steps can be counted by the counter 72, which requires 6 stages, the shift registers 81 to 83 require in the first instance only six stages each. Owing to the special kind of multiplication opted for here two further stages are, however, required so that for all three shift registers normal trade elements having 8 stages each were used.

The threshold value of 0.375 can be constructed from the sum of $0.25 + 0.125$, that is to say from the sum $\frac{1}{4} + \frac{1}{8}$. So the multiplication can be obtained by shifting the contents of the shift register 82 over two ($2^{-2}$ and three places ($2^{-3}$) respectively and by adding the two values. As this addition must be effected from the least significant bit (LSB) the most significant bit (MSB) is entered on taking over the contents of the counter 72 in the first stage P0 of the shift register 82 and the least significant bit (LSB) of the stage Q0 of the counter 72 is entered into the stage P5 of the shift register 82. The same applies to the further inputs. The shifte register 81 is connected in the same manner to the counter 71.

The outputs Q5 and Q6 are now connected to the operand input A and B of a full adder 73. The transfer input C is controlled by the output Q of a D flip-flop 74 which intermediately stores the signal at the transmission output C1 of the preceding addition. The sum output S is connected to the series-information input DS of the shift register 83. In this manner 1.5 times the value of the contents of the shift register 82 is first formed in the shift register 83 after eight shift clock pulses at the input V of the shift registers 82 and 83. The required value 0.375 is $\frac{1}{4}$ of this result, that is to say shifted over two places ($2^{-2}$) which is achieved by further using the output Q5 of the shift register 83. The contents of the shift register 81 has cycled once during these eight shift clock pulses and, for performing the signal comparison, the values appearing at the output Q5 are also used.

The series outputs of the shift registers 81 and 83 are connected to the two inputs of an exclusive-OR-gate 91 as well as to an input of an AND-gate 92 and 93 respectively, the other input of theses AND-gates being connected to the output of the exclusive-OR-gate 91. Comparison is done place-by-place starting from the place having the lowest value and that in combination with the bistable triggering circuit 90 in accordance with the following truth table:

| 81 | 83 | J | K | $Q^n + 1$ |
|---|---|---|---|---|
| 0 | 0 | 0 | 0 | $Q^n$ |
| 0 | 1 | 0 | 1 | 0 |
| 1 | 0 | 1 | 0 | 1 |
| 1 | 1 | 0 | 0 | $Q^n$ |

The result is that zeros which occur in pairs can no longer change the result so that also in the case of 6 zeros in each of the two registers 81 and 83 (that is to say in the case of the black-white reproduction: white picture elements in the two groups only) the correlation is positive. This comparison is done in 6 clock periods of the clock pulse signal at the output of the AND-gate 78, that is to say during the counting positions 9 to 14 of the counter 84. Thereafter no further clock pulses are produced at the output of the AND-gate 78.

So with a positive correlation the output Q of the bistable triggering circuit 90 has a logic "1" which is applied to the OR-gate 61 of FIG. 6 and which keeps the counter 60 in the reset position and that also if at the position 32 of the counter 84 a signal appears at the lead 53 which tries to switch the counter 60 on the leading edge.

In this manner comparing the signal of the shift registers 42 and 40 or 41 respectively is performed continuously and successively in groups of 32 signals each. Instead of comparing bit-by-bit by means of the exclusive-OR-gate 91 and the AND-gates 92 and 93 it is also possible to perform a parallel comparison of all positions simultaneously if for the shift registers 81 and 83 registers having parallel outputs are used which are connected to the inputs of a comparator having several parallel positions.

What is claimed is:

1. A method for correcting errors in line by line facsimile transmission, said errors creating a disturbed picture line having undisturbed remaining portions, said method comprising comparing the number of picture elements in a line with a predetermined number, shifting said line relative to a correctly received line upon determining that said number of elements is not equal to said predetermined number so that the beginning and end of said disturbed line are separately and individually aligned with correctly received lines, comparing by correlating said shifted line with respect to at least one adjacent line and comparing the resulting correlation value with respect to a threshold value to determine said remaining portions, and correctly reproducing said disturbed line using said remaining portions and replaced portions taken from at least one adjacent line so that said reproduced line comprises the predetermined number of picture elements.

2. A method as claimed in claim 1, wherein said reproducing step comprises placing the signals of at least one of the adjacent picture lines in those locations where on comparison no sufficient correlation is present between the signals of adjacent picture lines and wherein corresponding signals of the disturbed picture line are not taken into account.

3. A method as claimed in claim 2, wherein said comparing by correlating step is performed relative to the initial and the final portion of the disturbed picture line and said placing of the signals of at least one adjacent picture line is done in those places where an insufficient correlation is present either relative to the initial portion or relative to the final portion of the disturbed picture line.

4. A method as claimed in claim 2, wherein said step of comparing the signals of adjacent picture lines comprises grouping the signals of each picture line into equal groups, determining in each group the ratio of the number of signals of a given value whose position corresponds to the adjacent picture line to the total number of signals of this value in both compared groups, and if this ratio is below a predetermined threshold value said placing step comprises correcting all signals of the relevant group of the disturbed picture line.

5. A method as claimed in claim 4, wherein said correcting a group of signals of a disturbed picture line is performed only when on comparing of the signals of this group with the corresponding signals of the two adjacent picture lines the lack of correlation relative to the threshold value is ascertained in both cases.

6. A method as claimed in claim 5, wherein the separate comparisons to the two adjacent picture lines are done simultaneously.

7. A method as claimed in claim 4, wherein said correcting of a group of signals of a disturbed picture line is performed only when if on comparison the lack of correlation relative to the threshold value is found also in the adjacent group.

8. A method as claimed in claim 4, wherein the number of picture elements of a picture line the signals of which are comprised in one group is between 10 and 100 and the threshold value for the ratio is between 0.35 and 0.4

9. An arrangement for correcting errors in line by line coded word facsimile transmission having end of line characters, said errors creating a disturbed picture line having undisturbed remaining portions, said arrangement comprising first means for comparing the number of picture elements in a line with a predetermined number, means for shifting said line relative to a correctly received line upon determining that said number of elements is not equal to said predetermined number so that the beginning and end of said disturbed line are separately and individually aligned with correctly received lines, second means for comparing by correlating said shifted line with respect to at least one adjacent line and for comparing the resulting correlation value with respect to a threshold value to determine said remaining portions, and means for correctly reproducing said disturbed line using said remaining portions and replaced portions taken from at least one adjacent line so that said reproduced line comprises the predetermined number of picture elements.

10. An arrangement as claimed in claim 9, further comprising a decoder means for converting the received code words into corresponding sequences of electric signals, said first comparing means including a counter means coupled to said decoder means for counting the total number of signals per picture line and a comparator means coupled to said decoder means for comparing the counter reading with a predetermined value on receipt of an end-of-line character, a first store means coupled to said decoder for storing the decoded signals, at least a second store means coupled to said decoder for storing the signals of an adjacent line, said second comparing means comprising a comparator means coupled to the outputs of the two stores for comparing in parallel after receipt of the code word of a picture line signals read out successively from the stores, an output register, said reproducing means comprises means for ensuring that on insufficient correlation relative to the predetermined threshold value the transfer of the signals from the first store to said output register is interrupted and the output register is switched-over to the output of the second store, and a printing device coupled to the output register.

11. An arrangement as claimed in claim 10, wherein the second store stores the signals of the picture line which was received prior to the picture line whose signals are stored in the first store.

12. An arrangement as claimed in claim 10, wherein the second store stores the signals of the picture line which was received after the picture line whose signals are stored in the first store.

13. An arrangement as claimed in claim 10, further comprising a third store means for storing the signals of the picture line which is located next to the picture line the signals of which are stored in the first store and whose signals are not present in the second store, a third comparator means coupled to the outputs of the first and the third store for the parallel comparison of the signals read out successively from the stores, and said ensuring means ensures that on insufficient correlation relative to the predetermined threshold value for both comparators the switch-over of the output register from the output of the first store to the output of the second store is done simultaneously.

14. An arrangement as claimed in claim 10, wherein the first store comprises at least one shift register.

15. An arrangement as claimed in claim 14, wherein the shift register has a length equal to the number of signals per picture line and the first store comprises two shift registers, the first shift register storing the received line until full and the second shift register receiving all signals of a picture line and storing only the signals which were received last, one input of the comparator being coupled to the series output of the first shift register, and said ensuring means ensuring that on insufficient correlation relative to the threshold value said one input is switched-over to the series output of the second shift register and the input of the output register is switched-over to the output of the second store and upn a subsequent exceeding of the threshold value on sufficient correlation to the series output of the second shift register.

16. An arrangement as claimed in claim 10, wherein each comparator comprises a first and a second counter, the first counter counting the number of signals of the determined value which have the same position in both the stores which are coupled to the comparator and the second counter counting the total number of signals of the determined value in the two stores, further comprising a first and a second intermediate store respectively coupled to the counters, said intermediate stores taking over the counter reading after a predetermined number of signals read from the coupled stores, whereafter the counters are reset to a starting position, a third intermediate store, a multiplier means coupled to the second intermediate store for multiplying the contents of the second intermediate store by the threshold value of the ratio and for entering it into said third intermediate store, and a fourth comparator means for locally comparing the contents of the first and the third intermediate store to one another and for supplying a signal if the value present in the third intermediate store exceeds the value present in the first intermediate store.

* * * * *